May 20, 1969     A. GUIMENTO ET AL     3,445,659

CRYOGENICALLY COOLED RADIATION DETECTION APPARATUS

Filed Jan. 9, 1967

INVENTORS
ANGELO GUIMENTO
CHARLES T. KITZMILLER
BY
Harry W. Hargis III
AGENT

United States Patent Office 3,445,659
Patented May 20, 1969

3,445,659
CRYOGENICALLY COOLED RADIATION DETECTION APPARATUS
Angelo Guimento, Lansdale, and Charles T. Kitzmiller, Pottstown, Pa., assignors to Philco-Ford Corporation, Philadelphia, Pa., a corporation of Delaware
Filed Jan. 9, 1967, Ser. No. 608,198
Int. Cl. G01t 1/16
U.S. Cl. 250—83                              9 Claims

ABSTRACT OF THE DISCLOSURE

Cryogenically cooled radiant energy detection apparatus includes an infrared detector cell mounted on a generally rod-shaped heat sink having a generally dis-shaped base coaxial therewith. A hollow, tubular radiation shield susbtantially encloses the heat sink and has an aperture in one end thereof disposed for alignment with the sensing surface of the detector cell. A hollow tubular sealing element of glass is arranged coaxially with the radiation shield, and is provided in the region of one end with a window of infrared energy transmission material aligned with the aperture in the shield, and in the region of the other end with a flanged portion mating with and hermetically sealed to the base of the heat sink. Lead wires are sealed into the glass element and extend therethrough into electrical engagement with the detector cell. Apparatus for cryogenically cooling the device is disposed in heat exchange relation with the base of the heat sink.

This invention relates to radiation detection apparatus, and more particularly to improvements in the construction of detection devices requiring cryogenic cooling. While of broader applicability, the invention is directed to the construction of electro-optical devices of the type known as infrared detector cells.

In order to improve sensitivity to infrared radiation, it is a practice to operate detector cells at very low temperatures. For example, one known group of detector cells useful up to wave lengths of about $5\mu$ are operated at about 77° K. To achieve response to wave lengths beyond $5\mu$, for example to wave lengths up to about $15\mu$, another known type of detector cell is operated at about 30° K. Refrigeration to these temperatures is achieved with known cryogenic cooling means, such for example as hydrogen cryostats or closed cycle mechanical refrigerators. However apparatus for operating a detector cell at 77° K. does not always afford the degree of thermal isolation required for operating a detector cell at 30° K. Also, it is desirable to maintain a detector cell free of contaminants which affect its useful life and operation.

It is therefore a general objective of the present invention to provide novel detector cell construction that is encapsulated and sealed in novel manner to afford improved thermal isolation of a detector cell in order that it may be cooled to a particularly low range of cryogenic temperatures.

It is a further and more specific objective of the invention to improve the thermal isolation of detector cell means adapted for use with detachable cryostat apparatus of known design.

It is another objective of the invention to provide novel detector cell construction that affords freedom from contamination of the sensing element, both when in operation and when being handled.

In achievement of the foregoing as well as other objectives, the invention contemplates the provision of separately handleable, vacuum encapsulated infrared detector cell means adapted for releasable attachment to apparatus for cryogenically cooling such cell means, such as, for example, the cryotip of a conventional cryostat.

A preferred embodiment of the invention which achieves the aforementioned objectives comprises radiant energy detecting means provided with an infrared detector cell mounted on a generally rod-shaped heat sink having a generally disk-shaped base coaxial therewith. A hollow, tubular radiation shield, also known in the art as a "cold shield," substantially encloses the heat sink and has an aperture in one end thereof disposed for alignment with the sensing surface of the detector cell. A hollow tubular sealing element of glass is arranged coaxially with the radiation shield, and is provided in the region of one end with a window of infrared energy transmissive material aligned with the aperture in the shield, and in the region of the other end with a flange portion mating with and hermetically sealed to the base of the heat sink. Lead wires are sealed into the glass element and extend therethrough into electrical engagement with the detector cell.

Advantageously, the invention affords an encapsulated, separately handleable, radiant detection device that is protected from its environment both while in use and while being stored, as well as while being assembled with apparatus for cryogenically cooling the device.

The manner in which the foregoing as well as other objectives and advantages of the invention may best be achieved will be more fully understood from a consideration of the following description, taken in light of the accompanying drawing in which.

Figure 1:
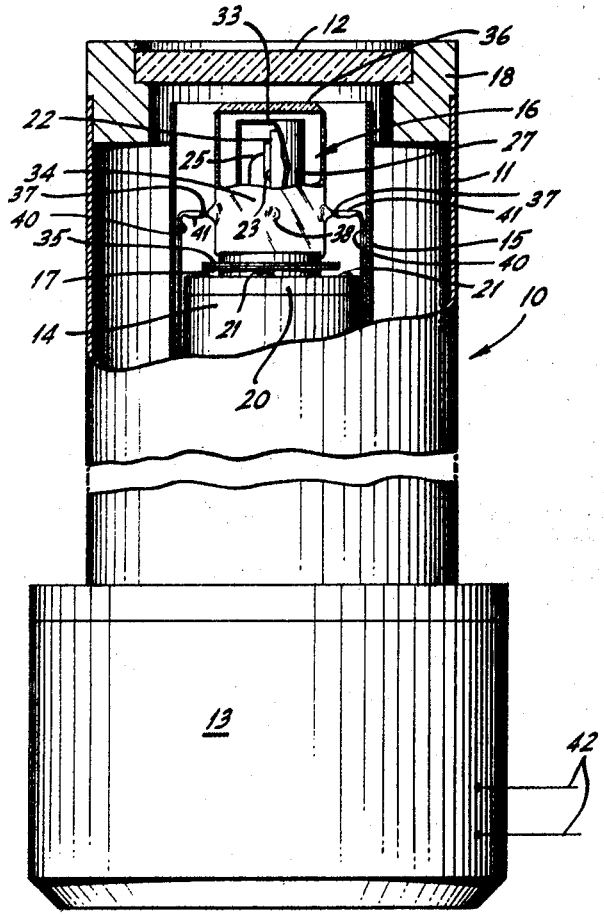
FIGURE 1 is an elevational showing, partly in section, of apparatus embodying the invention.
Figure 2:
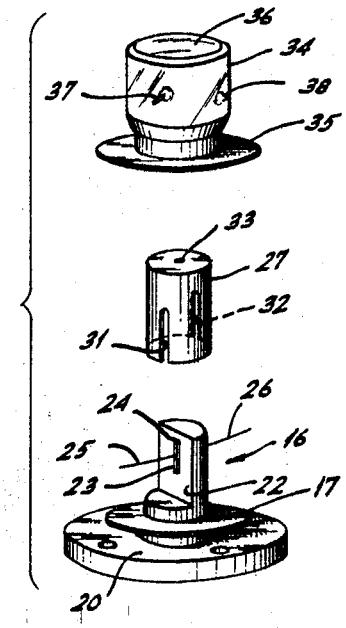
FIGURE 2 is an exploded view of a portion of the apparatus illustrated in FIGURE 1, and illustrating additional constructional features of the invention.

With more particular reference to the drawing, and first to FIGURES 1 and 2, the invention is embodied in a flask of Dewar type, designated generally by the numeral 10. Flask 10 comprises a tubular outer wall 11, one end of which is provided with a window 12 of infrared transmissive material sealed by a ring 18 of metal, such for example as stainless steel. A window material suitable for use in the apparatus of the present invention is zinc sulphide sold under the trademark "Irtran II." The other end of outer wall 11 is sealed in known manner to the body portion of conventional cryogenic cooling means, designated generally by the numeral 13. A cryotip 14, for example a copper rod, extends into flask 10 from cooling means 13, and supports detector cell means 16 in the flask. A tubular radiation shield 15 is supported within outer wall 11 and surrounds both cryotip 14 and cell means 16. While other materials have been found suitable, outer wall 11 preferably is made of stainless steel and shield 15 preferably is made of copper having shiny inner and outer surfaces. The region enclosed by outer wall 11, window 12, ring 18, and cooling means 13 is evacuated, and is capable of being assembled and disassembled in servicing the apparatus.

Still with reference to FIGURES 1 and 2, it is the detector cell means 16 with which the invention is particularly concerned, and this cell means comprises a disk-shaped base portion 17 provided with a flanged mounting portion 20 adapted for connection by screws 21 to cryotip 14. Base portion 17 preferably is made of an alloy of iron, cobalt, and nickel, one such alloy suitable for this purpose being sold under the trademark "Kovar." Base portion 17 further is provided with a generally rod-shaped, preferably cylindrical, infrared detector cell mount 22, also of Kovar, a portion of which is cut-away or relieved to provide a partially cylindrical section having a planar, diametrically extending surface as shown.

Figure 3:
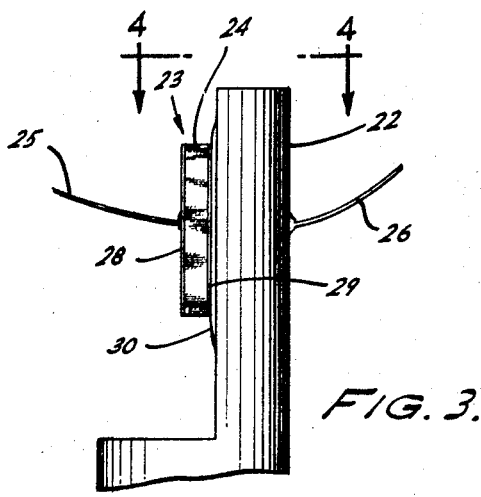
FIGURE 3 is an elevational showing, on a somewhat enlarged scale, of a portion of the apparatus illustrated in FIGURES 1 and 2.
Figure 4:
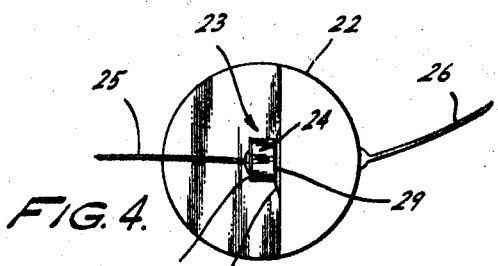
FIGURE 4 is a top plan view of apparatus illustrated in FIGURE 3, seen looking in the direction of arrows 4—4 applied to FIGURE 3.

With reference also to FIGURES 3 and 4, the sensing means preferably comprises a single-crystal mercury-doped germanium element 23 disposed upon the aforementioned planar surface, and having its sensing face 24 disposed in a generally horizontal plane whereby it is both aligned with, and presented in the direction of extension of, the axis of cylindrical cell mount 22. A pair of lead wires 25 and 26 extend generally radially of the mount 22, wire 25 being connected to germanium element 23 and wire 26 being connected to the mount.

Considered in greater detail (see FIGURES 3 and 4) sensing element 23 comprises opposed planar surface portions over which extend planar members 28 and 29 of Kovar. Member 29 is soldered to cell mount 22 by a layer of solder 30, such for example as a tin preform. Lead wire 25 is soldered to the other Kovar member 28 in provision of one electrical connection to sensing element 23. The other electrical connection to element 23 is through member 29, solder 30, cell mount 22, and thence to lead wire 26.

Further with special reference to FIGURE 1, a radiation shield 27, preferably of copper having shiny surfaces, is positioned telescopingly over cell mount 22. The side wall of shield 27 includes a pair of open ended slots 31 and 32 (see also FIGURE 2), through which extend the lead wires 25 and 26, respectively. The end wall of shield 27 includes an aperture 33 axially aligned with sensing face 24 of germanium element 23, and adapted to provide for irradiation of sensing face 24 from a source undergoing detection.

A tubular, preferably cylindrical, closure 34 of graded glass is positioned over radiation shield 27. One end region of closure 34 is sealed to a metal flange 35, also of Kovar, welded in known manner to base 17 of the cell mount, and an infrared energy transmissive window 36 extends over and is sealed to the other end region. The material Irtran II also has been found suitable for window 36. The glass of closure 34 is therefore so graded that its thermal expansion characteristic at one end matches that of the Irtran and its thermal expansion characteristic at the other end matches that of Kovar. Lead wires 25 and 26 extend through and are sealed within radially extending hollow metal pins 37, which pins, in turn, are sealed into glass closure 34. An exhaust tubulation tipoff 38 completes the unitary vacuum sealed cell construction.

Electrical connection is made to pins 37 by known lead wire construction 40 having disconnect-type terminals 41, such as, for example, spring clips. Lead wires 40 are insulated, extend along cold shield 15, and are provided with terminals shown somewhat diagrammatically at 42, in the region of the cooling means 13.

In operation, apparatus with which flash 10 is associated is so oriented as to place window 12 in confronting relation to a source of radiation undergoing detection. The sensing face 24 of the detector element 23 is then irradiated by radiant energy transmitted through windows 12 and 36, and through aperture 33.

Figure 5:
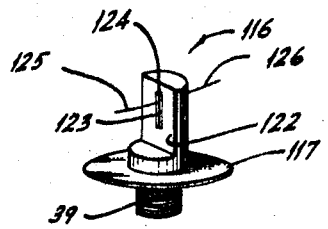
FIGURE 5 is a view similar to a portion of FIGURE 2, and illustrating a modified embodimen tof the invention.

A modified embodiment is seen in FIGURE 5, in which the construction is identical with that shown in FIGURES 1 and 2 with the exception of the form of base portion 39. Elements in FIGURE 5 identical with those in FIGURES 1 and 2 are designated by the same reference numeral with the prefix 1 added (i.e., lead wire 25 becomes lead wire 125, etc.). Base portion 39 comprises a threaded stud, and provides for threaded mounting of cell means 116.

Either embodiment of the invention is featured by its ease of attachment to cryogenic cooling means and its freedom from contamination, both while stored and while in use.

We claim:

1. Radiant energy detecting means adapted for use with cryogenic cooling apparatus, and comprising: infrared detector cell means mounted on a generally rod-shaped heat sink having a generally disk-shaped base coaxial therewith; a hollow tubular radiation shield disposed about said heat sink and having an aperture in one end thereof positioned for alignment with the sensing surface of the detector element; a hollow tubular glass sealing element arranged coaxially with the radiation shield, provided in the region of one end with a window of infrared energy transmissive material aligned with the aperture in said radiation shield, and provided in the region of the other end with a flange portion mating with hermetically sealed to the base of said sensing element; and lead wires including portions sealed into the glass element, and extending into electrical engagement with the detector cell.

2. Radiant energy detecting means according to claim 1, and further characterized in that said disk-shaped base includes a threaded stud for attaching said detecting means to such cryogenic cooling apparatus.

3. Radiant energy detecting means according to claim 1, and further characterized in that said glass sealing element comprises a hollow cylindrical body of graded glass, in that said window is affixed to an end of said sealing element having a thermal expansion coefficient corresponding to that of the window, and in that said flange portion is of metal and is sealed to the other end of said sealing element having a thermal expansion coefficient corresponding to that of the latter but differing from the thermal expansion coefficient of the one end.

4. Radiant energy detecting means according to claim 3 and further characterized in that said window comprises a sheet of zinc sulphide and in that said flange comprises an alloy of iron, cobalt and nickel.

5. Radiant energy detecting means according to claim 1 and further characterized in that said hollow tubular radiation shield is provided with open ended slots through which said lead wires extend.

6. Radiant energy detecting means according to claim 1 and further characterized in that said disk shaped base includes a peripheral flange portion for attaching said detecting means to such cryogenic cooling apparatus.

7. In cryogenic cooling apparatus for an electro-optical device; an outer tubular shell; an open-ended inner tubular shell of radiation shielding material coaxial with said outer shell; a radiation transmissive window over one end of said outer shell; a cryotip extending into said inner shell; a radiation sensing cell disposed within said inner shell in the region of said window; and self-contained closure means within said inner tubular shell enveloping and hermetically sealing said sensing cell, said closure means including a thermally conductive base portion supporting both said sensing cell and said closure means upon said cryotip.

8. Radiant energy detecting means according to claim 7, and characterized in that said closure means comprises a cylindrically shaped hollow glass sealing element provided in one end with a window of radiation transmissive material disposed adjacent the radiation transmissive window of said outer shell, and provided in the region of the other end with a flange portion mating with and hermetically sealed to the recited base portion.

9. Radiant energy detecting means according to claim 8, and further characterized by the inclusion of a radiation shield disposed about said sensing cell and within said closure means, said shield including an aperture optically aligned with said windows and said sensing cell.

References Cited

UNITED STATES PATENTS 3,103,585  9/1963  Johnson et al. _____ 250—83
3,114,041  12/1963  Amsterdam _____ 250—83

ARCHIE R. BORCHELT, *Primary Examiner.*